United States Patent Office 2,703,799
Patented Mar. 8, 1955

2,703,799

9α-HALO-11-OXO-16α,17α-EPOXYPROGESTERONES

Clarence G. Bergstrom, Chicago, Ill., assignor to G. D. Searle & Co., Chicago, Ill., a corporation of Illinois No Drawing. Application May 12, 1954,
Serial No. 429,361

4 Claims. (Cl. 260—239.55)

My invention relates to a new group of steroids and, more specifically, to 9α-halo-11-oxo-16α,17α-epoxyprogesterones. These compounds can be represented by the structural formula

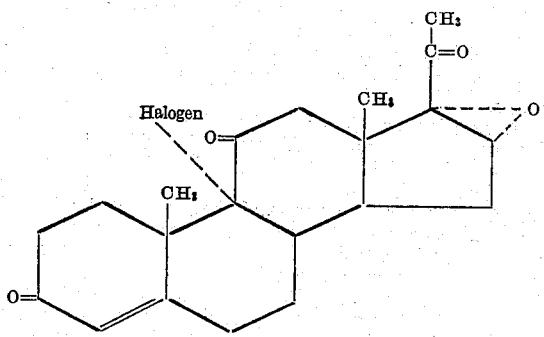

The halogen atom can be a fluorine, chlorine, bromine, or iodine atom.

The compounds of my invention have valuable pharmacological properties in the treatment of inflammatory diseases, the 9α-fluoro and 9α-chloro compounds being especially potent. The claimed compounds lack certain of those hormonal effects produced by the naturally occurring steroids which limit their field of therapeutic applicability. The claimed compounds are also valuable because of their regulatory effect on the cardiovascular system, particularly their antagonism to hypertension.

These compounds also serve as intermediates in the organic synthesis of other therapeutically valuable compounds. Thus treatment of a solution of the claimed steroids in glacial acetic acid with sodium iodide yields 9α-halo-21-desoxycortisones which are active antirheumatic compounds. Further, if the claimed 9α-halo-11-oxo-16α,17α-epoxyprogesterones are submitted to treatment with hydrogen bromide to open the epoxide and then hydrogenated in the presence of Raney nickel, 21-desoxycortisone, an active neoglycogenetic drug, is obtained.

I have discovered that the 9α-halo-11-oxo-16α,17α-epoxyprogesterones can be conveniently prepared from 9α,16β-dihalo-11,17α-dihydroxyprogesterones in a one-step reaction by treatment with a suspension of chromic oxide in an organic amine such as pyridine, picoline, lutidine, collidene, parvoline, conyrine, and the like. The 9α,16β-dihalo-11,17α-dihydroxyprogesterones are obtained by treatment of 9β,11β;16α,17α-bisepoxyprogesterone with a hydrogen halide in glacial acetic acid.

The following examples will illustrate in further detail some of the compounds which constitute my invention and methods for their preparation. However, it is not to be construed as limited in spirit or in scope by the details set forth therein as it will be obvious to those skilled in the art that numerous modifications in materials and methods can be adopted without departing from the invention. In these examples quantities are indicated in parts by weight.

Example 1

2500 parts of a casein digest medium are treated with 1 part of 16α,17α-epoxyprogesterone and inoculated with a culture of *Rhizopus nigricans* ATCC 62276 and shaken for four days. The reaction mixture is then extracted with hot ethyl acetate and the extract is evaporated to dryness. The residue is applied to a column containing 74 parts of silica gel. The column is washed with 900 parts of a 5% solution of ethyl acetate in benzene and then eluted with 900 parts of a 10% solution of ethyl acetate in benzene to recover unconverted 16α,17α-epoxyprogesterone. The column is next washed with 450 parts of a 20% and 220 parts of a 33% solution of ethyl acetate in benzene. Finally, the column is eluted with 220 parts of a 33% and 650 parts of a 50% solution of ethyl acetate in benzene. Concentration of these eluates yields 11α-hydroxy-16α,17α-epoxyprogesterone which, recrystallized from acetone and then from a mixture of benzene and cyclohexane, melts at about 238–238.5° C. The optical rotation of an 0.5% chloroform solution is $[\alpha]_D = +137°$. The ultraviolet absorption spectrum shows a maximum at 242 millimicrons with a molecular extinction coefficient of about 16,500.

To a solution of 100 parts of 11α-hydroxy-16α,17α-epoxyprogesterone in 200 parts of pyridine are added 151 parts of methanesulfonyl chloride. After standing for 16 hours, the product is precipitated by addition of water. After two recrystallizations from methanol, the 11α - methanesulfonyloxy - 16α,17α - epoxyprogesterone is obtained as crystals which melt at about 160–161° C. with decomposition. The optical rotation of an 0.5% chloroform solution is $[\alpha]_D = +124°$. The ultraviolet absorption spectrum shows a maximum at 238.5 millimicrons with a molecular extinction coefficient of 15,300. The infrared absorption spectrum shows maxima at 5.90, 5.98, 6.23, 7.37, 7.56, 8.52, 10.82 and 11.03 microns.

A solution of 107 parts of 11-methanesulfonyloxy-16α,17α-epoxyprogesterone and 107 parts of anhydrous sodium acetate in 1050 parts of glacial acetic acid is refluxed for 2 hours, concentrated to one-half of its original volume and then diluted with water. The crystalline precipitate is collected on a filter. The crude 16α,17α-epoxy-4,9(11)-pregnadiene-3,20-dione thus obtained melts at about 174–179° C.

To a solution of 78 parts of this compound in 1550 parts of purified dioxane are added 105 parts of 1–N perchloric acid and 50 parts of N-bromoacetamide. After 5 minutes the unreacted N-bromoacetamide is reduced with a dilute aqueous solution of sodium sulfite. The solution is cooled in ice and water is added slowly. The product separates as an oil which crystallizes on scratching. Successive recrystallizations from a mixture of acetone and petroleum ether and then from ethyl acetate yield 9α-bromo-11β-hydroxy-16α,17α-epoxyprogesterone melting at about 152.5–153° C. with decomposition. The optical rotation of an 0.5% chloroform solution is $[\alpha]_D = +166°$. The ultraviolet absorption spectrum shows a maximum at 243 millimicrons with a molecular extinction coefficient of 15,000. The infrared absorption spectrum shows maxima at 2.88, 3.00, 5.88, and 6.08 microns.

Example 2

A solution of 66 parts of 9α-bromo-11β-hydroxy-16α,17α-epoxyprogesterone and 140 parts of potassium acetate in 1600 parts of ethanol is refluxed for 1 hour and then concentrated to about 40% of its original volume. Water is added until crystals form. The precipitate is collected on a filter, dissolved in benzene and applied to a silica gel chromatography column. A 10% solution of ethyl acetate in benzene elutes the fraction containing 9β,11β;16α,17α-bisepoxyprogesterone which, recrystallized from acetone, melts at about 228–235° C. The optical rotation of an 0.5% chloroform solution is $[\alpha]_D = +49°$. An ultraviolet maximum is observed at 244 millimicrons with a molecular extinction coefficient of 13,000. Infrared maxima are observed at 5.85, 6.00, 6.20, 7.33, and 11.57 microns.

Example 3

A solution of 20.3 parts of 9β,11β;16α,17α-bisepoxyprogesterone and 53 parts of concentrated hydrochloric acid in 525 parts of glacial acetic acid is maintained at room temperature for 3 hours and then diluted with water. An oil separates which solidifies on cooling. Recrystallized from a mixture of petroleum ether, acetone and ethyl acetate, the 9α,16β-dichloro-11β,17α-dihydroxyprogesterone melts at about 196–197° C. with decomposition. The ultraviolet absorption spectrum shows a maximum at 241 millimicrons with a molecular extinction coefficient of 17,500. The infrared spectrum shows maxima at 2.91, 5.85, 6.06, 6.20, and 7.40 microns.

*Example 4*

A solution of 366 parts of 9α,16β-dichloro-11β,17α-dihydroxyprogesterone in 15,000 parts of pyridine is added to a suspension of 370 parts of chromic oxide in 5000 parts of pyridine. The reaction mixture changes from the bright yellow-organge color of the original suspension to a dark brown solution containing a mud-like precipitate. This mixture is maintained at room temperature for 19 hours. It is then stirred with two 50,000 part portions of ethyl acetate with an intervening filtration. The second extract is filtered and the two extracts are combined and washed successively with 1-N hydrochloric acid, water, saturated sodium bicarbonate solution and finally with water. The ethyl acetate solution is dried over anhydrous calcium sulfate, filtered and evaporated to leave a solid residue which is recrystallized twice from acetone. The melting point is variable, probably due to polymorphism. When a sample was put into a melting point block at 150° C. it softened and partially melted at 190.5° C., remained more or less static until it melted at 200.5–202.5° C. to a cloudy yellow liquid, and finally formed a clear yellow liquid at 212° C. The rotation of an 0.54% chloroform solution is $[\alpha]_D = +272°$. The ultraviolet absorption spectrum shows a maximum at 237 millimicrons with a molecular extinction coefficient of 16,300. Infrared maxima are observed at 5.83, 5.88, 6.03, and 6.22 microns. The 9α-chloro-11-oxo-16α,17α-epoxyprogesterone thus obtained has the structural formula

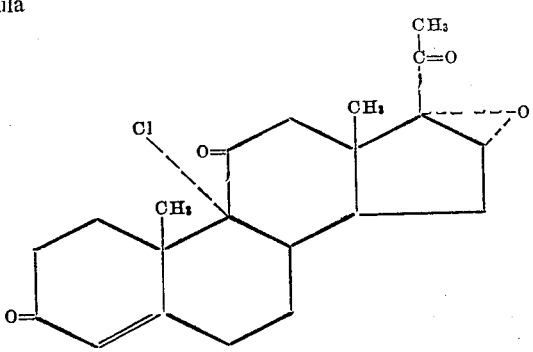

*Example 5*

A solution of 4 parts of 9α-bromo-11β-hydroxy-16α,17α-epoxyprogesterone in 105 parts of glacial acetic acid is treated with 21 parts of concentrated hydro-bromic acid and then allowed to stand at room temperature for 12 hours. Water is slowly added to the point of incipient crystallization and, after standing for 10 minutes, the precipitate is collected on a filter and washed with water. There is thus obtained crude 9α,16β-dibromo-11β,17α-dihydroxyprogesterone. The ultraviolet absorption spectrum shows a maximum at 241 millimicrons with a molecular extinction coefficient of 17,400.

A mixture of 10 parts of 9α,16-dibromo-11β,17-dihydroxyprogesterone in 400 parts of pyridine is treated with a suspension of 10 parts of chromic acid in 25 parts of pyridine. The reaction mixture is maintained at room temperature for 19 hours and then extracted with ethyl acetate. The extract is washed with dilute hydrochloric acid, water, saturated aqueous sodium bicarbonate solution and again with water. It is then dried over anhydrous calcium sulfate, filtered and freed from solvent by vacuum distillation. The residue is repeatedly recrystallized from ethyl acetate. No sharp melting point is obtained. The ultraviolet spectrum shows a maximum at about 237 millimicrons with a molecular extinction coefficient of about 16,500. Infrared maxima are observed at 5.83, 5.88, 6.03, and 6.22 microns. The 9α-bromo-11-oxo-16α,17α-epoxyprogesterone has the structural formula

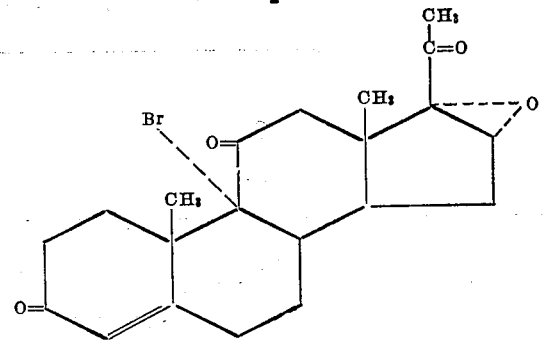

*Example 6*

A stream of anhydrous hydrogen fluoride is bubbled into a solution of 10 parts of 9β,11β;16α,17α-bisepoxyprogesterone in 100 parts of alcohol-free chloroform for 10 minutes at room temperature. The reaction mixture is then washed with aqueous sodium bicarbonate solution and with water and finally dried. On concentration, the 9α,16β - difluoro - 11β,17α - dihydroxyprogesterone is obtained as a gum. The ultraviolet absorption spectrum shows a maximum at 240 millimicrons with a molecular extinction coefficient of 18,500. The infrared absorption spectrum shows maxima at 2.91, 5.85, 6.06, and 6.20 microns.

A solution of 10 parts of 9α,16α-difluoro-11β,17α-dihydroxyprogesterone in 50 parts of pyridine is added to a suspension of 10 parts of chromic oxide in 50 parts of pyridine. This reaction mixture is maintained at room temperature for 24 hours and then extracted with ethyl acetate. The extract is washed successively with dilute aqueous hydrochloric acid and water, saturated sodium carbonate solution and finally with water. The extract is then dried over anhydrous sodium sulfate, filtered and evaporated. The residue, crystallized from ethyl acetate, does not give a sharp melting point. The ultraviolet absorption spectrum shows a maximum at about 235 millimicrons with a molecular extinction coefficient of 17,000. Infrared maxima are observed at 5.88, 6.02, and 6.21 microns. The 9α-fluoro-11-oxo-16α,17α-epoxyprogesterone thus obtained has the structural formula

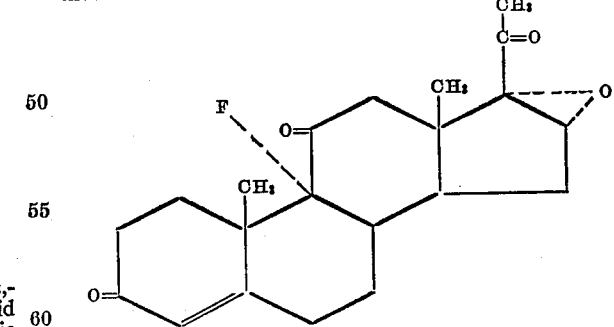

I claim:
1. A 9α-halo-11-oxo-16α,17α-epoxyprogesterone of the structural formula

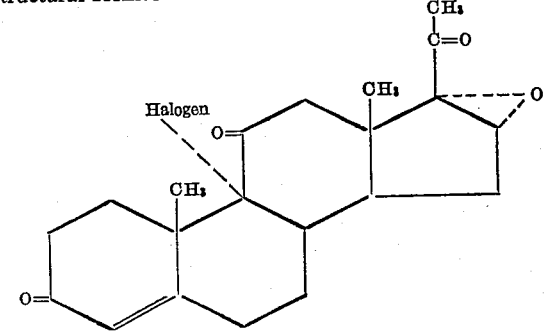

wherein the halogen atom has an atomic weight smaller than 100.
2. 9α-fluoro-11-oxo-16α,17α-epoxyprogesterone.
3. 9α-chloro-11-oxo-16α,17α-epoxyprogesterone.
4. 9α-bromo-11-oxo-16α,17α-epoxyprogesterone.

No references cited.